March 6, 1945.　　　R. P. CARLTON　　　2,370,636
MANUFACTURE OF ABRASIVES
Filed March 23, 1933　　　6 Sheets-Sheet 1
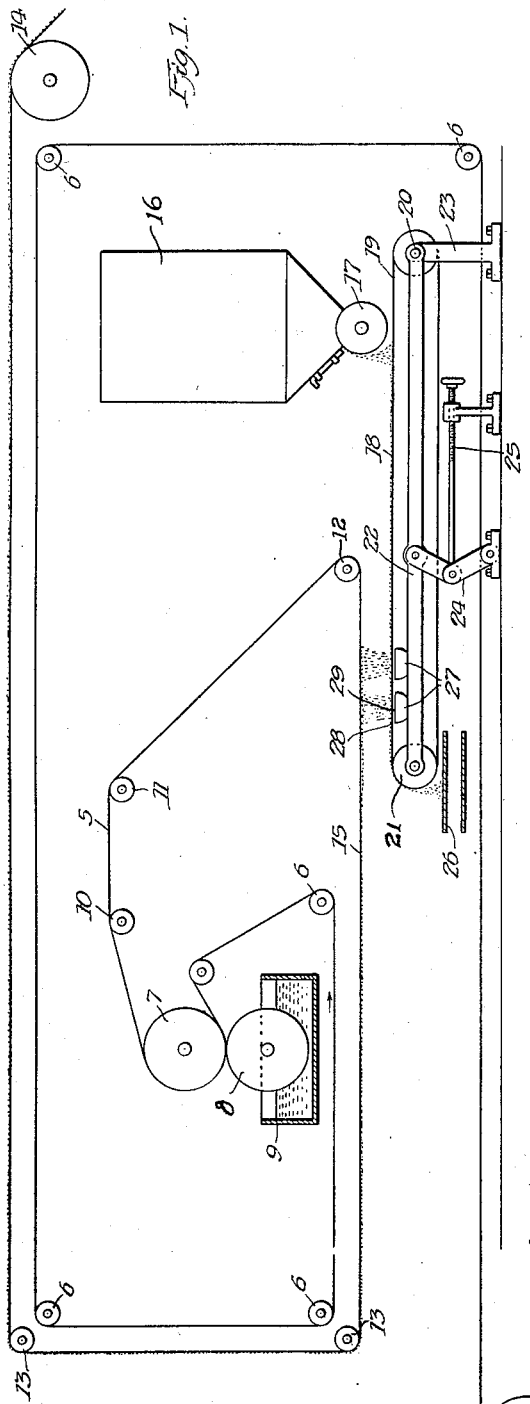
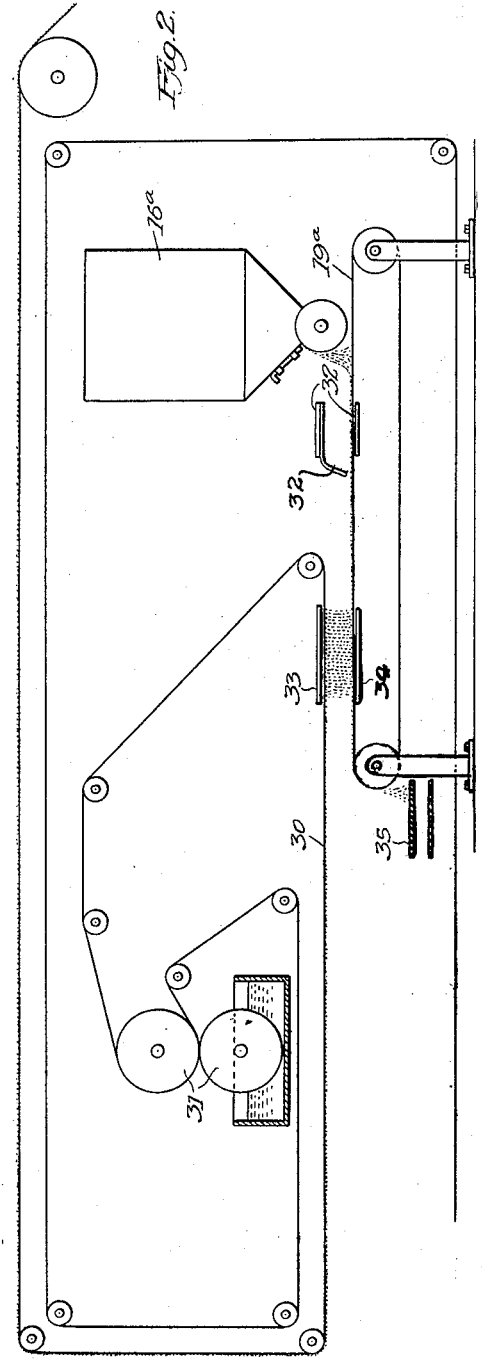
Inventor
Richard Paul Carlton

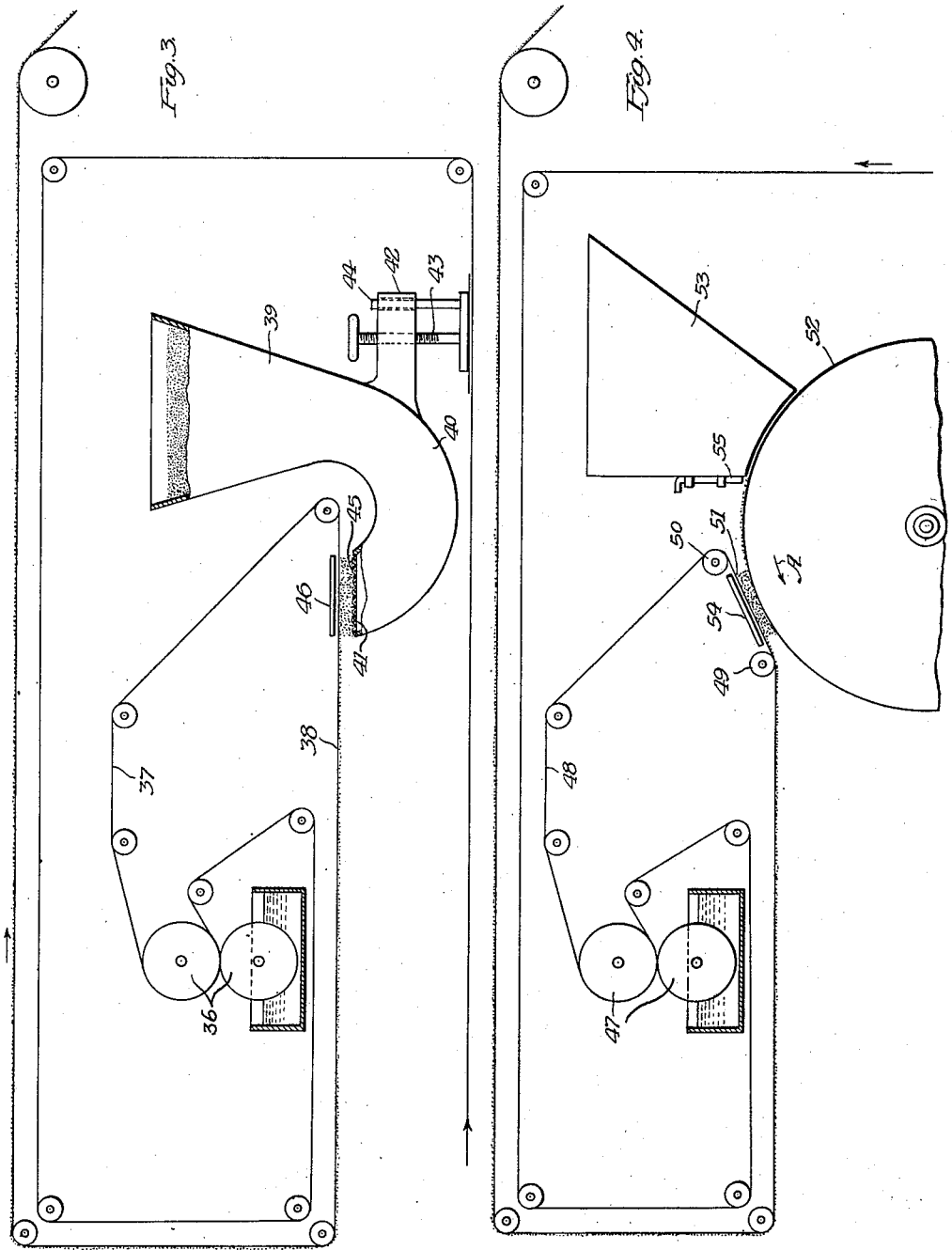

March 6, 1945.  R. P. CARLTON  2,370,636
MANUFACTURE OF ABRASIVES
Filed March 23, 1933  6 Sheets-Sheet 3

Inventor
Richard Paul Carlton

March 6, 1945.  R. P. CARLTON  2,370,636
MANUFACTURE OF ABRASIVES
Filed March 23, 1933   6 Sheets-Sheet 4
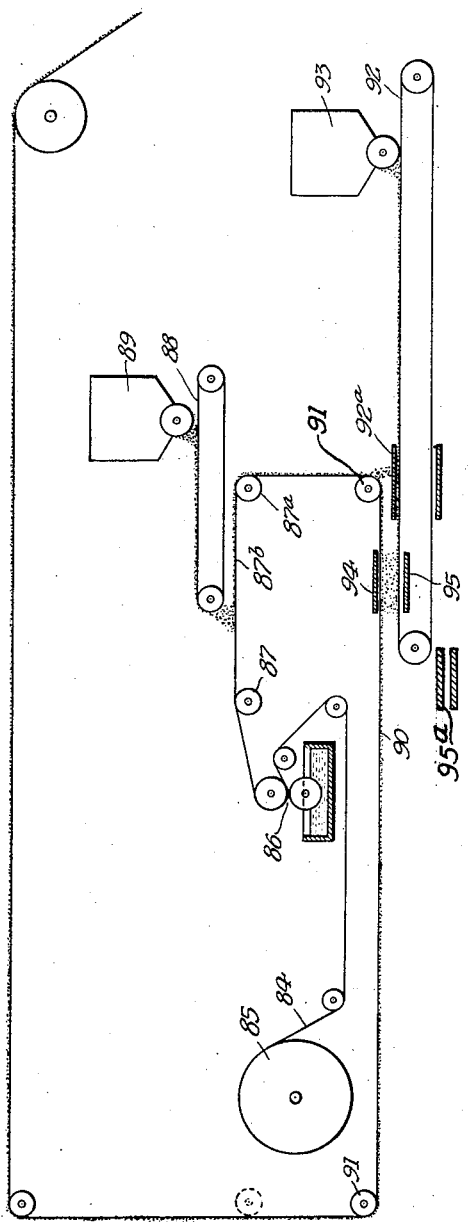
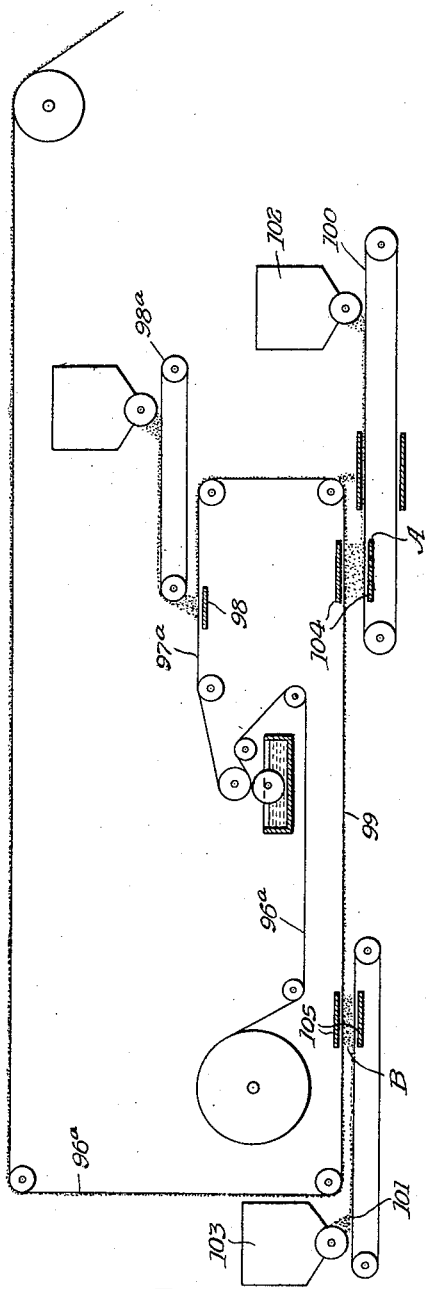
Inventor
Richard Paul Carlton March 6, 1945.  R. P. CARLTON  2,370,636
MANUFACTURE OF ABRASIVES
Filed March 23, 1933  6 Sheets-Sheet 5
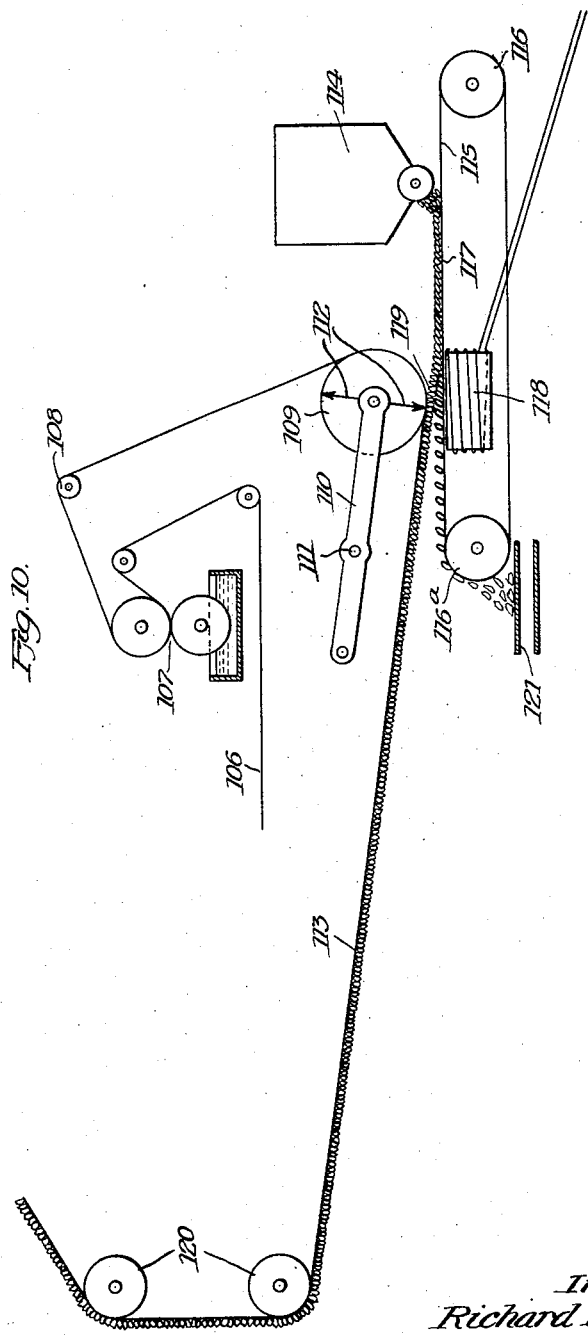
Inventor
Richard Paul Carlton March 6, 1945.  R. P. CARLTON  2,370,636
MANUFACTURE OF ABRASIVES
Filed March 23, 1933  6 Sheets-Sheet 6

Inventor:
Richard Paul Carlton

Patented Mar. 6, 1945

2,370,636

UNITED STATES PATENT OFFICE 2,370,636

MANUFACTURE OF ABRASIVES

Richard Paul Carlton, St. Paul, Minn., assignor to Minnesota Mining & Manufacturing Company, Wilmington, Del., a corporation of Delaware Application March 23, 1933, Serial No. 662,319

1 Claim. (Cl. 117—17)

This invention relates in general to coated articles and to the art of coating, and more particularly to an improved method of and apparatus for applying pulverulent coatings to suitably adhesively coated surfaces, and while the invention finds particular utility in the art of making flexible abrasives, and is, therefore, described and illustrated for this purpose, it finds a wide field of utility for analogous purposes.

This application is a continuation in part of my application S. N. 422,065, filed January 20, 1930, now Patent No. 2,318,570, granted May 4, 1943. Said parent application being directed to methods of and apparatus for applying coatings such as abrasive particles to a suitable backing by the action of an electrical field broadly, and in certain respects more particularly in applying such coatings of abrasive particles by the action of an electrical field irrespective of the force of gravity.

It is well known that in the art of making sandpaper, emery paper or cloth and similar abrasive articles, a flexible or in some cases, a rigid, backing of paper, cloth, wood or the like, is employed, to which is applied a coating of an adhesive substance, such as animal or vegetable glue, or where a waterproof article is desired, the backing may be coated with any of the now well known waterproof adhesives of the Okie Patents 1,565,027, 1,565,028, of Dec. 8, 1925, or 1,581,657 of April 20, 1926, for this purpose, and while the coating is still wet or unset, a suitable abrasive material such as garnet, corundum, sand or the like is applied thereto. The grains of abrasive substances are usually applied by gravity upon the upper adhesive coated surface of the backing and they lie in the adhesive material in haphazard fashion due to the elongated nature of the abrasive particles, and, in a large degree, the facets or cutting edges of the individual grains or grits often lie flat upon or are embedded in the adhesive coating in such a manner that in some instances their best cutting edges never come into contact with the work or, at best, are brought inefficiently into contact therewith. The invention here has as one of its objects to measureably increase the number of grits whose longer or greater dimensions are in a plane perpendicular to the surface of the backing, thereby to present more efficiently the cutting edges to the work, and increase the cutting ability and life of the abrasive article.

It will be understood that in ordinarily depositing mineral, that is, pulverulent abrasive material solely under the force of gravity onto a backing, it acquires a velocity due to the action of gravity. As the grits pass through the intervening air space, there will be caused some change in their positions enroute to the sheet or backing, but ordinarily neither the velocity given to the grits or the effect of the air on them is sufficient to cause them to become aligned so as to assume positions substantially perpendicular to the backing. It is, therefore, necessary that independent force be applied to the grits, and I have found that by passing the grits through a static field of electric energy or of electro-magnetic energy or by mechanically imparting this force to the grits, a much greater number of the individual particles will assume erect positions on the backing, which will enhance its cutting ability. As will later appear, my invention, in its several forms, is capable of application for operation in conjunction with gravity methods of applying the grit, inasmuch as under certain conditions, and for some purposes, it is desirable to employ both gravity and one of the forms of my invention in conjunction in order to attain a desired form of abrasive article.

In carrying out this invention, I find it desirable to employ a conveyor for conducting the mineral at rest relative to the conveyor by relatively slow speed to a point adjacent to which the independent force is applied for projecting the particles of grit onto the backing. I find that by then applying this independent force, be it mechanical or electrostatic or electromagnetic, I am able to impart a high velocity to the particle so that any force of gravity acting on the particle, whether in the same direction, in a counter direction, or in a direction angularly to that at which the force is applied, will be relatively small compared to this force applied. It is possible with the present invention to apply the force directly counter to gravity, that is, by bringing the grits beneath the backing or by applying the force in some other direction as long as the force of gravity and the effect of air is reduced below a point which will interfere with the result desired, namely, the projection of the grits with their longitudinal dimensions ultimately perpendicular, or substantially so, with respect to the backing.

The principal objects and advantages of this invention reside in the provision of an improved abrasive coated article, such, for example, as sandpaper, emery cloth, or the like, wherein the abrasive grits or grains lie in position on the backing for increasing the cutting effect and durability of the abrasive article; the provision of an improved abrasive article wherein the abrasive grits are disposed so that their cutting facets are presented in position to more efficiently engage the work and thereby produce a sharper article; the provision of an improved abrasive article wherein the abrasive grains or grits are applied thereto with their longer or greater dimension substantially perpendicular to the plane of the backing; the provision of an improved abrasive article which may be flexible or rigid, as desired, and which may or may not be made waterproof, that is, suitable for employment in a water abrading operation.

This invention further includes as objects and advantages thereof, the provision of an improved method of and apparatus for manufacturing abrasive articles; the provision of an improved method of and apparatus for applying pulverulent material to one surface of a backing irrespective of the force of gravity, that is, against the normal tendency of the force of gravity; the provision of an improved method of and apparatus for propelling a pulverulent material, such as a grit or an abrasive grain, against an adhesive coated surface; the provision of an improved method of and apparatus for the purpose set forth and including electrically operated means for acting on an abrasive grain or pulverulent material and causing it to advance onto the adhesive coated backing irrespective of the force of gravity; the provision of an improved method of and apparatus for causing the particles of pulverulent material to impinge upon and assume a position in the adhesive coated surface substantially normal or perpendicular to the surface of the backing; the provision of an improved method of and apparatus for propelling a pulverulent material onto a moving sheet in a direction transversely to the plane of movement thereof and in a direction substantially counter to gravity; the provision of an improved method of and apparatus for making abrasive articles, such as sandpaper and the like, which includes the application of a grit to the under side of the backing; the provision of an improved apparatus which includes means for feeding and applying a pulverulent material counter to the force of gravity and simultaneously with movement of the backing; the provision of an improved means for moving a web of paper and applying an adhesive thereto and including means arranged below and for operating synchronously with for applying a pulverulent material to the under side of said moving backing; and the provision of an apparatus of the character described wherein improved electrostatic or electromagnetic means may be employed, acting on the abrasive material and causing it to move at an accelerated speed toward the sheet so as to cause it to impinge thereon in the adhesive coating and thereby present the cutting edges of the abrasive grits away from the surface of the backing and thus increase the cutting ability and life of the abrasive article.

I have also found my invention useful as a modifying step in the employment of the conventional gravity process for applying grit in the manufacture of sandpaper or other abrasive and, therefore, additional objects of this invention reside in the provision of an improved method of interposing an additional step which will apply abrasive grains either before or after the application of grits by gravity in the usual manner, it being understood that the step of applying grit irrespective of gravity by an electromagnetic or electrostatic means may be employed somewhere in the process of manufacture, the essential purpose being to increase the number of grits whose cutting facets are presented away from the backing and thereby to enhance the cutting ability of the finished article.

The apparatus of this invention includes a number of alternative forms for mechanically or electrically carrying out the steps of the process and to this end is provided an improved pneumatic means and improved vibrator structure for mechanically propelling the pulverulent materials and improved electromagnetic structure for acting on the mineral and causing it to move in a cloud toward the adhesive coated surface of the moving web or backing.

The foregoing and such other objects and advantages as may appear or be pointed out as this description proceeds are attained in the structures illustrated in the accompanying drawings in which:

Figure 1 is a schematic view illustrating one form of apparatus for carrying out the process of this invention;

Figure 2 is a view similar to Figure 1 of an alternative form of the invention;

Figures 3, 4 and 5 are further alternative forms of the invention which include the electrical feature;

Figures 8 and 9 are additional alternative forms of apparatus for carrying out further steps of the process of this invention;

Figure 10 is a further alternative form of apparatus for carrying out one of the methods of this invention.

Figure 5:
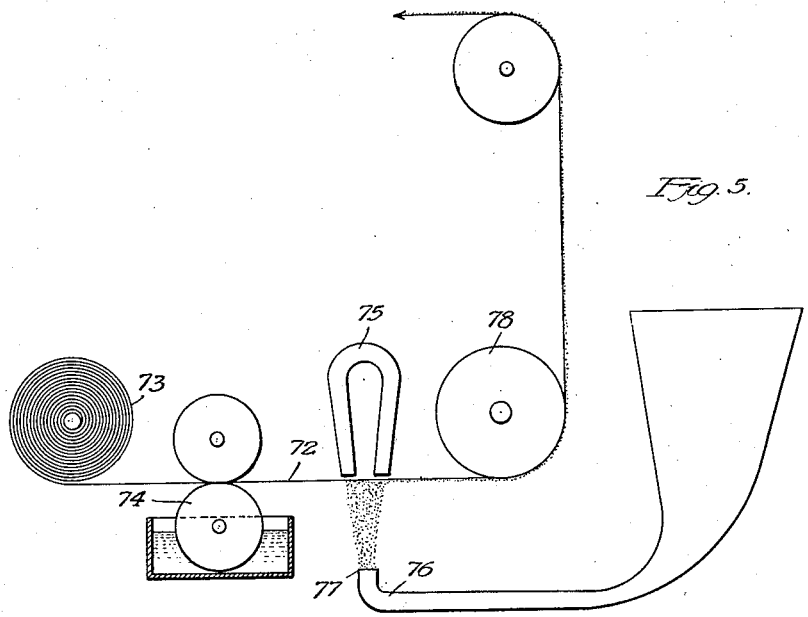

The method of the present invention includes as steps thereof the feeding of a web or strip of paper or other fabric at a predetermined rate of speed, applying an adhesive substance to the under side of the sheet, or applying the adhesive coating to one side and then moving the sheet with the coated side out, and simultaneously with the movement of the coated sheet causing a grit or abrasive material to be applied to this side. The sheet or web of paper may be moved so that the adhesive coated side is either presented downwardly or at any angle thereto. The movement of the abrasive grains onto the under side of the backing is done irrespective of the force of gravity and, in fact, directly counter to gravity, and preferably done by imparting relatively high velocity to the abrasive material, thus causing it to impinge upon the adhesive coating. In view of the fact that the abrasive grains are projected through an intervening space from a suitable carrier on to the adhesive coated side irrespective of or counter to the force of gravity, the grains, which are usually somewhat elongated, will assume a position in transit so that the longer dimension thereof will take a position normal to the surface of the backing, thus causing the grains to "stand" on the surface rather than lie flat in greater percentage than when they are deposited by gravity. It is to be understood that this movement of the grains and deposition of them on the coated surface may be carried out in a number of ways, either by vibration, by an airblast, or by electrostatic or electromagnetic means.

In the alternative forms of this invention later to be described, the method involved includes combining a gravity deposition of mineral on the adhesively coated moving backing with the step of applying the grits irrespective of gravity, this being particularly useful in some of the heavier grits wherein it may be found that the force susceptible of application by an electrostatic or an electromagnetic means is not sufficiently active on the available area of the individual grits to cause an entirely satisfactory result or to move enough of the grits onto the sheet to attain the desired end. In this invention it may be required to apply some of the grit by gravity and later apply some of the grit by one of the methods of this invention or vice versa, but, in any event, the number of grits in the entire finished article which stand erect on the backing will be measureably increased over the ordinary methods heretofore employed for depositing grit on a backing for forming an abrasive article.

This invention produces a very satisfactory piece of sandpaper in which the cutting ability is measurably increased and by the deposition of the grains of sand or grit irrespective of the force of gravity, it is possible to produce an orientation of the mineral as desired and to control the thickness of the abrasive coating much more readily than where gravity alone is relied upon or employed for depositing the grains on the sheet.

The apparatus of this invention may take any one of the forms shown in the drawings and in the form of the invention shown in Figure 1, air pressure is resorted to for producing the mineral cloud and for projecting the mineral onto the moving web.

Referring now more particularly to Figure 1, the flexible backing 5 of paper or cloth or other fabric is trained or fed over a series of rollers 6, 6, and over one of a pair of the squeeze rollers indicated at 7, the other roller 8 of said pair being in contact with an adhesive material contained in a tray or tank 9 by which an adhesive coating is applied to one side of the moving web. After receiving the adhesive coating, the web 5 is trained over rollers 10 and 11 and is brought back over a roller 12 so that the adhesive coated surface of said web is presented downwardly. The web may then be trained over rollers 13, 13, and fed to a suction drum 14, whence it passes into festoons for drying.

The mineral is supplied from a hopper 16 and a conventional outlet 17 which feeds a layer 18 of mineral to a moving conveyor 19. This conveyor 19 is preferably porous and passes over the feeding rollers 20 and 21 and is adapted to move at a suitable rate of speed to supply a sufficient quantity of abrasive grain. In some cases, it has been found advantageous to move the conveyor at a speed substantially the same rate of speed as the web 15, although these speeds are, of course, variables. The rollers 20 and 21 are mounted in the ends of a suitable frame 22 and this frame may be raised and lowered so as to vary the distance between mineral conveyor 19 and the moving web 15. This frame 22 may be supported fixedly at one end, as indicated at 23, and the other end may be raised and lowered by a toggle arrangement 24 activated by a threaded rod 25. Below the conveyor 19 and at the movable end thereof, that is, adjacent to the web 15, there is provided a second conveyor 26 which serves to conduct away excess mineral which flows over the end of the conveyor 19 and which may be returned in any suitable manner to the mineral hopper.

Below the upper flight of the conveyor 19, there are provided two air troughs 27. These air troughs are provided with flat upper walls 28, having slots 29 therein, said slots extending across the width of conveyor 19 and the troughs themselves being connected to a suitable source of air under pressure.

These troughs form in effect elongated jets or nozzles and when so placed below the conveyor belt or frame 22, a small quantity of air is emitted at high velocity which passes through the porous belt or conveyor.

It will be understood that when a blast or blasts of air are delivered from the troughs 27, this blast of air passes through the porous conveyor 19 and blows the mineral from the conveyor against the under side of the flight 15 so that the mineral is caused to strike into the adhesive at a relatively high velocity and become impinged therein. Owing to the projecting of the mineral in this manner through the intervening air space, the individual particles of grit or abrasive material are caused to assume a position parallel to their trajectory, that is, with their longer dimension perpendicular to the surface of the flight 15. In view of the fact that most of the particles of mineral are somewhat elongated due to the manner of production of the same, they will naturally assume this position in movement from the conveyor 19 to the adhesive coated surface of the backing. As they arrive at the adhesive material, they impinge themselves thereon and will thus stand erect in the adhesive, thus forming a sharper contour for abrasive purposes. By varying the rate of speed of the moving backing relatively to the speed of the conveyor and by varying the distance between the conveyor and the backing and the velocity of the air stream, and by increasing or reducing the number of such jets and the quantity of adhesive applied, any reasonable desired thickness of grit layer may be produced during the process and without stopping the apparatus. It will be understood that the excess mineral carried by the conveyor may be dumped into the conveyor 26 and returned by any suitable means to the hopper 16.

Referring now to Figure 2, there is provided the same general arrangement of moving backing, having the flight 30 adhesively coated from the squeeze rollers 31.

Below the flight 30 there is provided a mineral feeding conveyor 19a, receiving pulverulent material from the hopper 16a.

The conveyor 19a is mounted for movement toward and away from the flight 30 similar to the conveyor 19 and, therefore, this structure has not been shown in Figure 2.

As the mineral flows from the hopper 16a it does not always assume a smooth or even distribution on the conveyor 19A, and therefore, it may be desirable to provide a pair of charged electrodes 32, one arranged above and one below the conveyor 19A, for the purpose of spreading the mineral evenly on the conveyor belt. The conveyor 19A in this instance may be non-porous.

When charged electrodes are put in this position they act in principle the same as the charged electrodes used for coating the mineral on the backing. An electrical charge or difference of potential is set up between the electrodes 32. The voltage or difference in potential between those electrodes is maintained great enough to produce a strong static field, but not so great as to break down the insulation between the plates, which insulation may be the dielectric strength of the air or the dielectric strength of the air plus the dielectric strength of any insulating material which may be used to wrap the electrodes.

As the mineral on the conveyor enters the static field between the plates the mineral particles take on the charge of the lower plate, and are repelled to the upper plate where they lose their charge and take on the opposite charge of the upper plate. At this point they are repelled to the lower plate. Since new mineral is being conveyed by the conveyor into the field continuously the static fields soon become supersaturated with mineral particles, and an equilibrium is reached where as many particles are thrown out of the static field as are brought in by the conveyor. By having a down-turned end 32A of the upper electrode the mineral particles that are thrown out of the static field are deflected evenly on the conveyor belt so that a smooth coating of abrasive grit is first placed on the conveyor.

The use of a static field for getting a smooth coating of mineral on the conveyor belt is not necessary to the invention but is an additional means of obtaining evenly distributed abrasive coatings, and is also a means for avoiding the use of any excess mineral on the conveyor. When the mineral is evenly coated on the conveyor at the time it is being coated streaks, thin spots, etc., in the finished product are reduced.

At the same approximate point at which troughs 27 are provided in Figure 1 there are here provided electrically charged electrodes 33 and 34, the electrode 34 being located below the upper flight of the conveyor belt 19A and electrode 33 being disposed above the flight 30 of the backing. A sufficient difference of potential is maintained at electrodes 33 and 34 to produce a strong static field, similarly to that referred to above. This static field moves the mineral from the belt 19A to the underside, which is the adhesive coated surface of the flight 30.

As the mineral enters the static field between the electrodes 33 and 34 it becomes charged with the charge of the lower plate, and is here propelled to the upper plate 33.

It will be observed that in this method of coating the mineral is applied by a force other than gravity. In all other methods of coating sandpaper, known to me, the velocity of the particle is either in whole or part given to it by the force of gravity. In the case of this electrostatic coating the particles are oriented in the static field so that there is a tendency for the long dimension of the mineral to be perpendicular to the electrode plates, and also perpendicular to the web 30, which is being coated. The finished sandpaper product, therefore, contains a substantial percentage of the particles of mineral standing on end rather than laying flat, thereby increasing the cutting properties of the abrasive article.

Excess mineral is dumped onto the conveyor 35, whence it may be returned to the hopper 16a.

Referring now to the alternative form of the invention shown in Figure 3, there are provided the squeeze rollers 36 which apply adhesive to one surface of the moving paper web 37 and the adhesive coated surface thereof is presented downwardly in the flight 38.

In this instance there is provided a hopper 39, having a curved outlet spout 40 whose outlet 41 is presented below the moving web 38. The hopper may be provided with a bracket 42 whereby to receive a threaded member 43, said bracket engaging a guide post 44. In this manner, the hopper may be raised or lowered so as to vary the distance of the outlet 41 from the flight 38 of the backing. A suitable screen 45 may or may not be provided over the outlet so as to cause the distribution of the mineral contained in the hopper. In this instance, the mineral flows by gravity to the outlet 41, but does not pass from the outlet to the adhesive coated backing by gravity, but under the effect of the static charge established between the electrode 46 and the hopper or the screen 45 of said hopper.

The operation of the invention here is much like that of Figure 2, the screen 45 serving the purpose of distributing the mineral and at the same time preventing the large body of mineral in the hopper from forcing it against the coated surface of the backing.

Referring now to the form of the invention shown in Figure 4, there is provided the adhesive coating rollers 47, applying an adhesive coating to one surface of the moving web 48. This web 48 is trained over rollers 49 and 50 so that flight 51 thereof between said rollers is presented in a plane tangential to the surface of a conveyor drum 52 whose lineal velocity is sufficient to furnish the required amount of mineral. This drum is fed from a hopper 53 and forms one electrode of the electrostatic system. The other electrode is indicated at 54 and is disposed above the flight 51. As mineral issues from the gate 55 of the hopper, the drum rotating in the direction of the arrow $a$, the mineral is carried to a point adjacent to the flight 51 whereupon the electrostatic charge set up between the drum 52 and the electrode 54 will cause a projection of the mineral from the drum onto the coated surface of the flight 51.

Referring now to the alternative form of the invention shown in Figure 5, there is employed here electromagnetic means or a permanent magnet means for moving the grits toward the adhesively coated web. The adhesively coated web is shown at 72 and is fed from a roll 73 over an adhesive coating roller 74. The horizontal flight of the web 72 passes beneath magnet 75 which may be either an electromagnet upon which a variable voltage may be imposed or a permanent magnet.

Immediately below the magnet 75 and the flight 72 of the web, there is provided a source of supply for the mineral, that is, the abrasive material, indicated at 76. This source includes an outlet 77, and the distance between the outlet 77 and the moving web 72 may be varied as desired, or the intensity of the electromagnet, where one is employed, may be varied for changing the thickness of the abrasive coating. The web passes over an idler 78 whence it is fed to festoons not shown.

Figure 6:
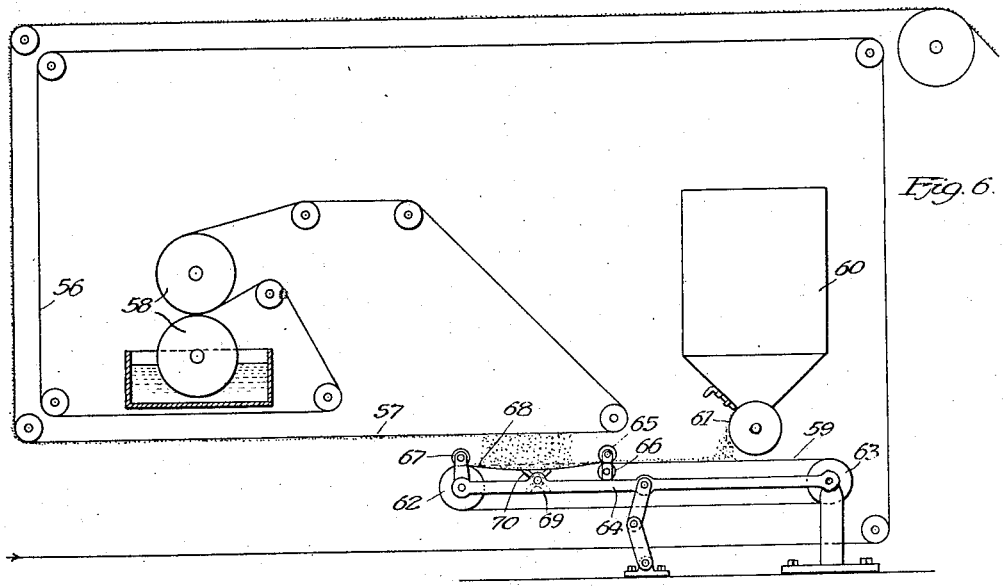
Figure 6 is a further alternative form of the apparatus of this invention for employing vibrating means.

Referring now to the form of the invention shown in Figure 6, the moving web 56 is trained over a series of rollers similar to the arrangement shown in Figures 1 and 2 so that a horizontal flight 57 of the paper backing is provided, having an adhesive coating on the under side thereof. Squeeze rollers 58 engage the paper backing for applying an adhesive thereto.

In this form of the invention, a mechanical vibrating means is provided which serves to propel the mineral, that is, the grit, from the grit feeding conveyor 59, which latter receives mineral from the hopper 60, having a gate 61. The conveyor 59 is trained over rollers 62 and 63 mounted in a suitable frame 64, which latter may be mounted for adjustment toward and away from the flight 57 similarly to the conveyor 19 of Figure 1. The conveyor 59 extends below and is separated from the flight 57 of the paper web and travels at substantially the same speed as the paper web.

The conveyor 59 passes between sets of pinch rollers, one above and one below the upper flight of the conveyor 59, as indicated by 65 and 66, and also beneath a pinch roller 67 which bears on the roller 62. The pinch rollers 65 and 66 tend to distribute the mineral evenly over the surface of the conveyor and are so spaced from the rollers 62 and 67 that the portion of the belt 59 between the rollers 65 and 66, and 62 and 67 is permitted to lie slack, whereas the remaining part of the conveyor is substantially taut. This arrangement tends to limit the vibration of the conveyor belt to the zone of application of the mineral to the paper backing, as indicated at 68.

Beneath the portion 68 of the belt 59, there is provided a revolving batter 69 operating on a shaft carried in suitable bearings in the frame 64 and provided with a plurality of radial arms 70 which upon rotation rigidly strike the under side of the portion 68 of the belt, thus throwing or projecting the mineral content thereof against the under side of the adhesive coated paper backing, much in the manner in which the air stream blows the mineral or grit against the paper backing as shown in Figure 1. The batter 69 may be driven in any desired manner from a separate source of power or may be connected suitably with the rollers driving the belt 59, but geared to operate at a greater rate of speed. The rollers 65 and 66 and the roller 67 are separately driven from the belt 59 so as to produce the tautness in the belt, except the flight of the belt indicated at 68.

Figure 7:
Figure 7 is an enlarged schematic view illustrating a portion of an abrasive article made in accordance with this invention.

In Figure 7, there is illustrated an article made in accordance with the present invention. The backing is shown at 80 to which an adhesive coating 81 has been applied, and the grits, greatly enlarged, are indicated at 82 and it is noted that they stand on end in the adhesive coating, thus causing their sharper edges to project beyond the upper or outer surface of the coating, thereby enhancing the cutting ability and increasing the life of the abrasive article. While the article shown in Figure 7 is purely schematic, it will be understood that the mineral actually does take a position substantially normal to the backing and, while all of the grits may not take this position, a large number of the same do and the cutting qualities of the abrasive article are thus greatly increased. Furthermore, by so disposing the grits, it permits of the application of an additional sizing coat or coats to the back and to the front or cutting face of the abrasive material without completely burying the grits and as a thicker coat of adhesive may thus be employed on the cutting face of the abrasive material, the engagement of the adhesive material with the abrasive material is greatly enhanced, thus further tending to increase the life of the abrasive article. Such a sizing coat is indicated at 83.

As previously pointed out where the electrostatic or electromagnetic methods are resorted to in some of the coarser grades of abrasive devices made, it may be found that the electrostatic or magnetic field into which the particles are conducted may not exert on each individual particle sufficient force to cause proper orientation of the particles for the reason that the static effect is substantially proportional to the area of the particle, and the coarser the particle, the smaller the area of effect per weight. Therefore, as larger grits or sizes of particles are employed, increased force is required to move the particle and for some purposes, insufficient increase in force results because of the reduced area per weight. Therefore, in such cases a form of the invention, as shown in Figure 8, may be resorted to wherein the mineral is applied to the adhesively coated backing in part by gravity and in part by electrostatic or electromagnetic means.

In view of the fact that the electrostatic and electromagnetic means may for some purposes be alternatively employed, I have illustrated in Figure 8 merely the electrostatic elements though it will be understood that the electromagnetic means of Figure 5 may be employed in the same manner.

Referring in detail to Figure 8, I have illustrated a web of paper 84 coming off a roll 85 and passing through an adhesive coating device illustrated in general at 86. The web 84 is thence trained over rollers 87, 87a, so that it has a substantially horizontal flight 87b, which receives grits in the desired amount from an ordinary conveyor 88, said conveyor receiving grits from the hopper 89. The web of paper thence is carried downwardly to a horizontal flight 90 by the provision of rollers 91, 91 and adjacent one end of this flight, I provide the conveyor 92 receiving additional grits from the hopper 93, which may be adjustably mounted similar to the conveyors hereinabove described, said conveyor 92 passing beneath the flight 90 of the paper web. As the web passes over the rollers 87a and 91, a quantity of the mineral deposited from the conveyor 88 onto the web will drop off, and, for conveying away this excess mineral, I provide a transversely running conveyor 92a arranged between the flight 90 and the conveyor 92. Beneath the upper flight of the conveyor 92 and above the flight 90 of the web 84, I provide static electrodes 94 and 95, or may provide an electromagnet similar to that shown in Figure 5 which will cause grit coming from the hopper 93 to be applied counter to the force of gravity onto the under surface of the flight 90. A conveyor 95a may be employed for carrying off the excess mineral from the conveyor 92.

In the operation of this form of the invention, it will be understood that a desired proportion of mineral applied by gravity to that applied by force other than gravity may be determined by actual operation so that the desired quantity of the abrasive grits is properly applied to the paper web.

It may be necessary in some of the very coarse grains to additionally apply grit to the moving web and this may be done by providing an additional conveyor similar to that indicated at 92 and additional electrodes, or may be accomplished by additionally applying by gravity grits to the paper web just before it passes on to the festoons.

Figure 9 illustrates the alternative forms suggested in connection with Figure 8, that is, wherein electrostatic or electromagnetic means, or any other means counter to gravity, is employed for applying the grits and in Figure 9 the paper web is indicated at 96a having a horizontal flight 97a disposed below a conveyor 98a. In this instance, the grits are deposited from the conveyor 98a by gravity, and the orientation of the grits is assisted by a plate electrode 98. The paper web may then be carried in position so as to provide a horizontal flight 99 and an electrostatic or electromagnetic or other grit applying means for applying grit counter to gravity may be employed at one or more points as indicated at A and B, wherein the conveyors 100 and 101 convey grit from suitable hoppers 102 and 103, and electrodes 104, 104 and 105, 105 serve to apply the grit.

Referring now in detail to Figure 10, there is further illustrated there an apparatus for applying the grit to the adhesively coated backing by an electromagnetic means. In this form of the invention a moving web is provided indicated at 106, this web being a flexible strip of paper which is suitably adhesively coated by a mechanism indicated generally at 107.

The moving web thus adhesively coated is carried over a roller 108, thence over a roller 109, said roller 109 being mounted on a shaft carried in a bearing arm or arms 110 pivotally mounted at 111, whereby the roller 109 may be raised and lowered in the substantially vertical plane of the arrows 112, thus permitting the lower flight 113 of the paper web to be elevated or depressed, as the case may be.

Mineral is deposited from a hopper 114 on to a conveyor 115 trained over rollers 116 and 116a, the upper flight 117 of said conveyor passing beneath the roller 109 and the moving web, and conveying mineral, that is, the grit, to a point adjacent to the roller 109.

Preferably immediately below the axis of the roller 109 and below the upper flight 117 of the conveyor 115 I provide an electromagnet 118 which is so mounted that its magnetic flux passes through the conveyor and causes the mineral particles to stand erect, as indicated at 119, as they move along with the upper flight of the conveyor. While the mineral particles are thus standing erect they come into contact with the adhesively coated side of the paper backing and are thus picked up by it and conveyed away, the backing being trained over rollers 120 and carried to the festoons similarly to the other forms of the invention. It will be observed that the angularity of the lower stretch 113 of the paper web is such that it lies upwardly to the conveyor 115. In this way the particles of grit adhering to the paper are not knocked down by other particles remaining on the conveyor, it being understood that the grit is fed somewhat in excess of the required amount so that an adequate amount will be deposited on the adhesively coated side of the backing. The excess mineral drops off the conveyor 117 and is carried to a collecting means by a conveyor 121.

It will be understood that the amount of mineral fed from the hopper, the strength of the electro magnet, that is, the strength of the flow current transferred and the position of adjustment of the roller 109 may all be properly correlated for obtaining the desired grade of finished article.

It may be desirable that a certain amount of pressure be exerted on the erect particles of mineral so as to cause them to impinge upon the adhesively coated side of the paper and thus, by manipulation of the arms 110, an adjustment of the pressure of the roller 109 may be attained.

It will be understood that while the electrostatic and electromagnetic means for coating counter to gravity are illustrated in Figures 8 and 9, the mechanical means hereinabove described may be conveniently employed in these locations without departing from the spirit of the invention. However, the reason the electromagnetic and electrostatic elements are particularly shown here is that the difficulty of counter coating successfully with the coarser grains is more likely to arise with these elements than with the vibrator or air blast heretofore described.

It will be understood that the forms of the invention disclosed herein employing electromagnetic fields are suitable for use with magnetically responsive materials but that other grit or abrasive material may be coated with a magnetically responsive film which would render the grit responsive to the action of the magnetic or electro-magnetic fields.

In the actual production of this invention, particularly where an electrostatic field is employed, some grit sizes require the employment of very high voltages and in employing such high voltages it will be appreciated by those skilled in the art that this involves the construction and installation of special electrical apparatus for producing and maintaining the high voltages, and at the same time necessitates the provision of adequate protection for workmen engaged in the production of sandpaper or the like abrasive article under these conditions.

The form of the invention shown in Figure 3 hereinabove described, is found to be of value in that lower voltages may be employed for producing deposition and orientation of the particles of grit, inasmuch as there is a constant mechanical force exerted on the particles tending to move them toward the sheet to be coated. It is to be noted that the screen disclosed in Figure 3 may be omitted and a controlled supply of the particles to the outlet afforded in any convenient manner. Furthermore, the mounting of the hopper in Figure 3 may be adjusted so that the outlet is moved toward or away from the sheet as desired. In this instance, due to the force of gravity on the mass of abrasive particles contained in the hopper bearing on those adjacent th outlet, the particles are moved upwardly toward the sheet by the mechanical force thus exerted. Coupled with this, an electrostatic field of a relatively lower voltage or difference of potential may be employed.

Figure 11:
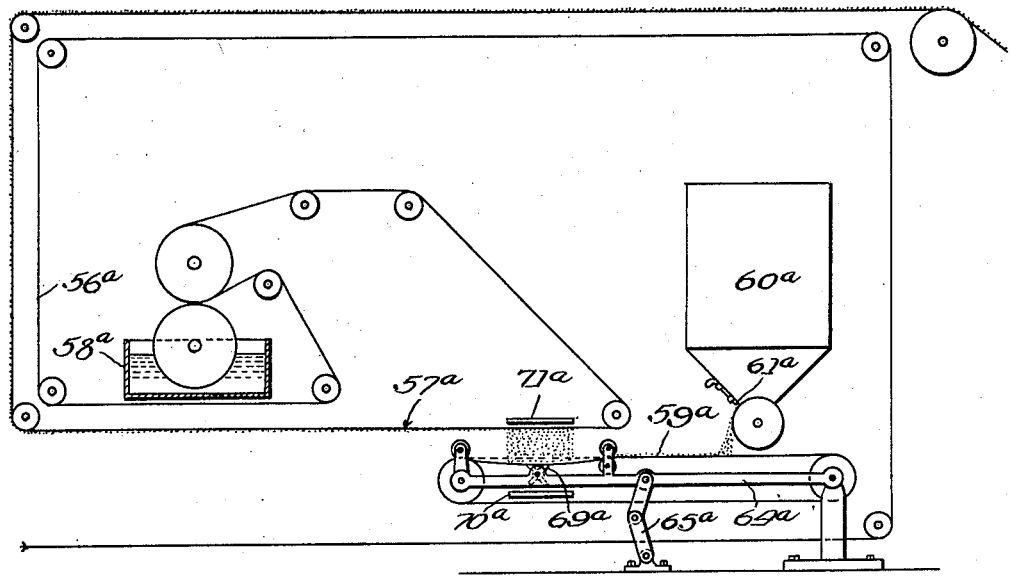
Figures 11 and 12 are further alternative forms for carrying out additional methods of the present invention.
Figure 12:
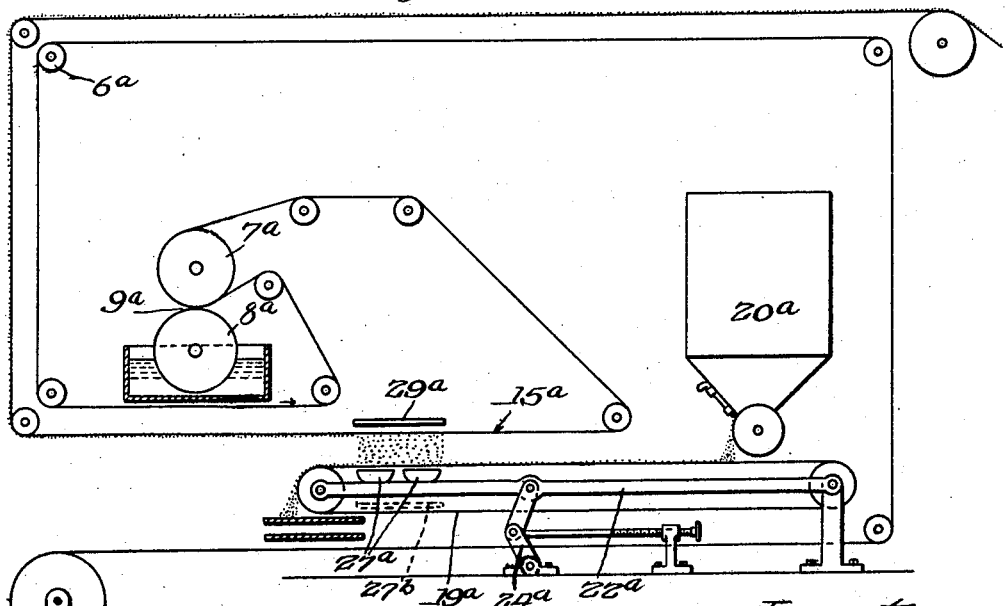

Owing to the fact that the structure of Figure 3 involves the provision of means for obtaining a nicety of control and balance which might readily become out of control in use, I have provided the forms of the invention shown in Figures 11 and 12.

In the structure of these figures it is possible to control to a nicety the mechanical and electrical forces exerted to obtain the desired result, namely, orientation of the particle on the adhesively coated sheet with its major axis perpendicular to the sheet.

Referring now to Figure 11, it will be observed that a flight of paper follows the path similar to that shown in Figure 6, the paper being indicated at 56a, and being coated on one side from a tank 58a and supplied to the coating apparatus with one flight 57a of the paper having its adhesively coated side presented downwardly. Beneath the adhesively coated flight 57a, I provide a conveyor 59a on which grit particles are deposited from a controlled hopper 60a having a gate 61a. The conveyor 59a supplies the grit particles in a direction to the left as viewed in Figure 11 to a point below the adhesively coated flight 57a of the paper web.

Beneath the conveyor 59a adjacent to the point of deposit of grit on the sheet, I provide a beater 69a, similar to that shown in Figure 6. The beater and conveyor are mounted on suitable supporting means comprising the arm 64a, and toggle means 65a for adjusting the arm and the conveyor.

Also supported from the arm 64a I provide an electrode 70a, which has a complemental electrode 71a located above the horizontal flight 57a of the paper web, thus the beater acts to raise the grit particles from the conveyor 59a and may be regulated so as to exert a force insufficient for causing the particles to reach the adhesively coated sheet 57a, but when the electrical field is established between the electrodes this field combining its forces with the mechanical force exerted by the beater will serve to cause the particles to be propelled on to the adhesively coated surface and due to the polarisation effect of the electrostatic field to orient the particles with their major axes substantially perpendicular to the adhesively coated sheet.

It will be understood that by proper control of the electrostatic field and the mechanical forces imparted to the particles by the beater 69a that quite as desirable effects can be obtained in the ultimate abrasive article as are obtained in the other forms of the invention already described. Furthermore, this form of the invention permits of the employment of a much lower difference of potential or voltage between electrodes for obtaining the desired result.

Referring now to Figure 12, there is provided a web of paper trained over rolls 6a and coated at 9a by rolls 7a and 8a, this web being so trained over r iditional rolls as to present an adhesively coated flight 15a with the adhesive presented downward.

Beneath the flight 15a I provide a supporting arm 22a having mounted thereon a conveyor 19a receiving sand from a hopper 20a. The arm 22a may be adjusted by a toggle mechanism indicated at 24a and the conveyor 19a conducts grit from the hopper 20a to the point beneath the flight 15a of the adhesively coated web.

At this point I provide a plurality of nozzles 27a delivering an air blast upwardly through the conveyor 19a, said conveyor preferably being of a screen character permitting the air stream to pass through the conveyor and tend to raise the grit particles into the space between the conveyor and the adhesively coated surface of the flight 15a.

Above the flight 15a I provide an electrode 29a and the air blast nozzles 27a may serve as another electrode supplemental to the electrode 29a.

Thus an electrostatic field may be established between the electrode 29a and the nozzles 27a, but of insufficient force to, operating alone, lift the grit particles and deliver them to the adhesive sheet, but coupled with the agitation of the particles caused by the air blast, the combined forces of the air blast and the electrostatic field serve to deposit, orient and distribute the particles in the desired position on the adhesively coated flight 15a.

If desired, a separate electrode 27b may be added instead of employing the nozzles 27a as electrodes.

I wish to point out that where the expressions "electromagnetic" and "electrostatic" are employed in the specification, I refer to the employment as well of a permanent magnet or some other form of static charge or magnetic charge which will perform the function.

Having thus described my invention and illustrated its use, what I claim as new and desire to secure by Letters Patent is:

The method of coating a backing with a pulverulent material of elongated dimensions which includes as its steps forming said material from a bulk source of supply into a preliminarily distributed layer arranged in a plane in substantial parallelism to the backing and the propulsion of the pulverulent material from said layer under relatively high velocity onto one surface of the backing in a direction counter to the force of gravity for effecting an orientation of said material with its elongated dimension substantially erect in respect of said backing surface.

RICHARD PAUL CARLTON.